United States Patent [19]

North, Jr.

[11] Patent Number: 4,543,748
[45] Date of Patent: Oct. 1, 1985

[54] STERILIZER DOOR ASSEMBLY

[75] Inventor: Howard L. North, Jr., Newfoundland, N.J.

[73] Assignee: Vernitron Corporation, Lake Success, N.Y.

[21] Appl. No.: 547,659

[22] Filed: Nov. 1, 1983

[51] Int. Cl.⁴ .............................................. E05C 9/00
[52] U.S. Cl. ......................................... 49/395; 292/6; 292/64; 292/144; 220/323; 49/13
[58] Field of Search ...................... 292/5, 6, 43, 63, 64, 292/251, 144; 49/395, 13, 31, 402, 276, 279; 220/323, 327

[56] References Cited

U.S. PATENT DOCUMENTS 2,373,480 4/1945 Lambert ........................... 49/395 X
3,385,655 5/1968 Huston et al. .................. 292/144 X

FOREIGN PATENT DOCUMENTS 501578 2/1939 United Kingdom .................. 49/395

*Primary Examiner*—Kenneth Downey
*Attorney, Agent, or Firm*—Edward H. Loveman

[57] ABSTRACT

A door assembly for a sterilizer includes a rectangular door on which is a vertical rail assembly movable horizontally toward and away from the door on threaded posts. Nuts carried by the rail assembly are rotated on the posts by sprockets entraining a motor driven chain. The rail assembly carries spring mounted axially retractable horizontal pairs of locking bars. The bars are inserted into and removed from sockets in a doorway frame by turning angularly as the rail assembly moves horizontally. A pressure responsive locking mechanism engages the sprockets to prevent their turning when the sterilizer is above a predetermined pressure. Cables carried by the locking bars actuate a switch in an alarm circuit for indicating that any one or more bars is not engaged properly in its respective socket. Limit switches stop operation of the motor when the rail assembly reaches extremes of inward and outward movement.

9 Claims, 18 Drawing Figures

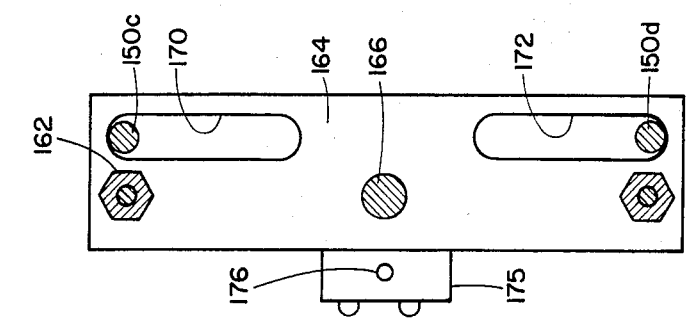
FIG.16
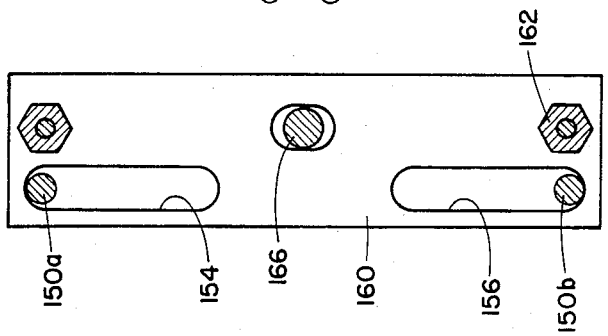
FIG.15
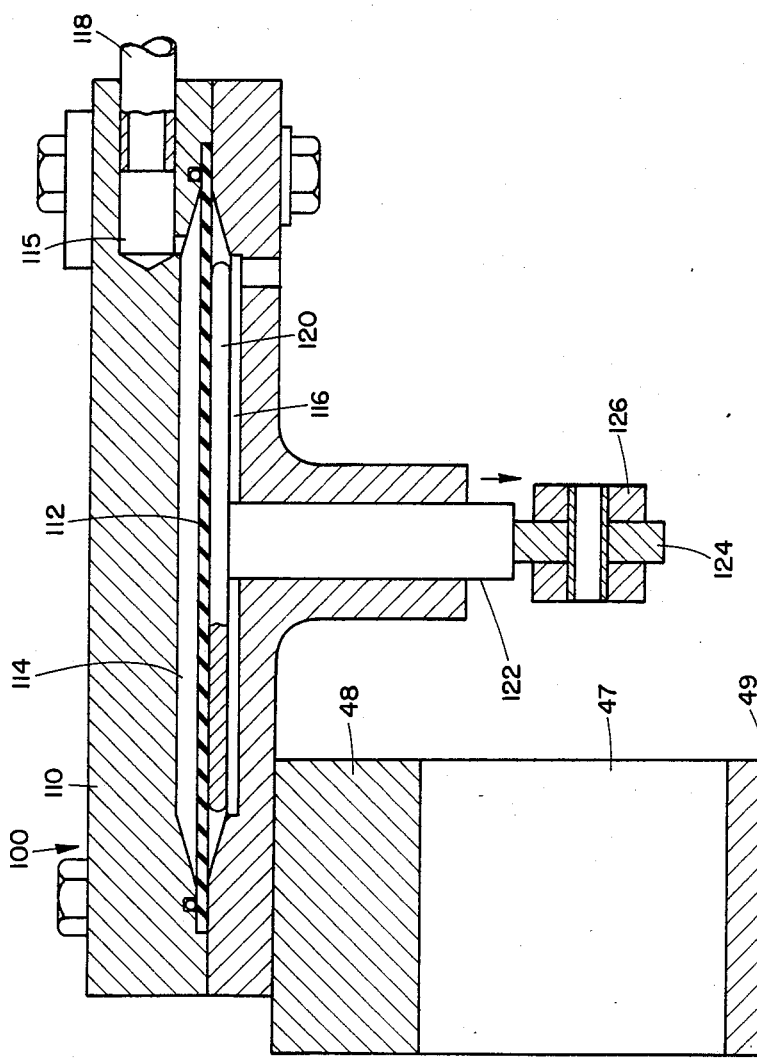
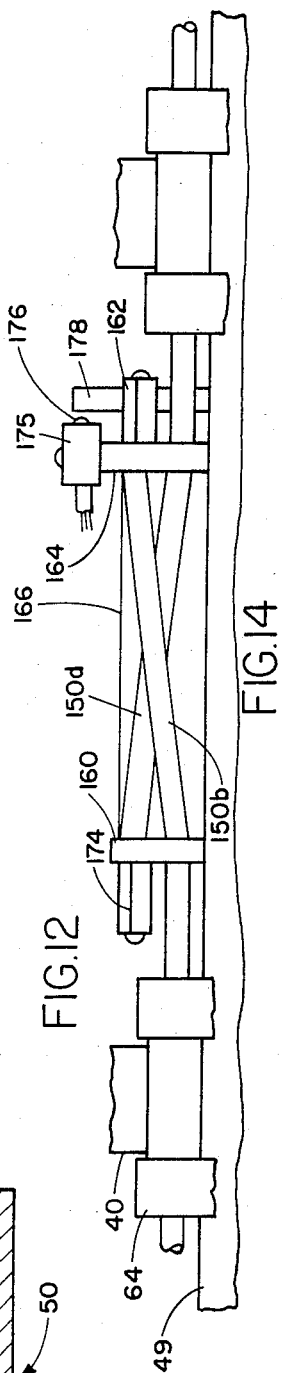
FIG.14
FIG.12

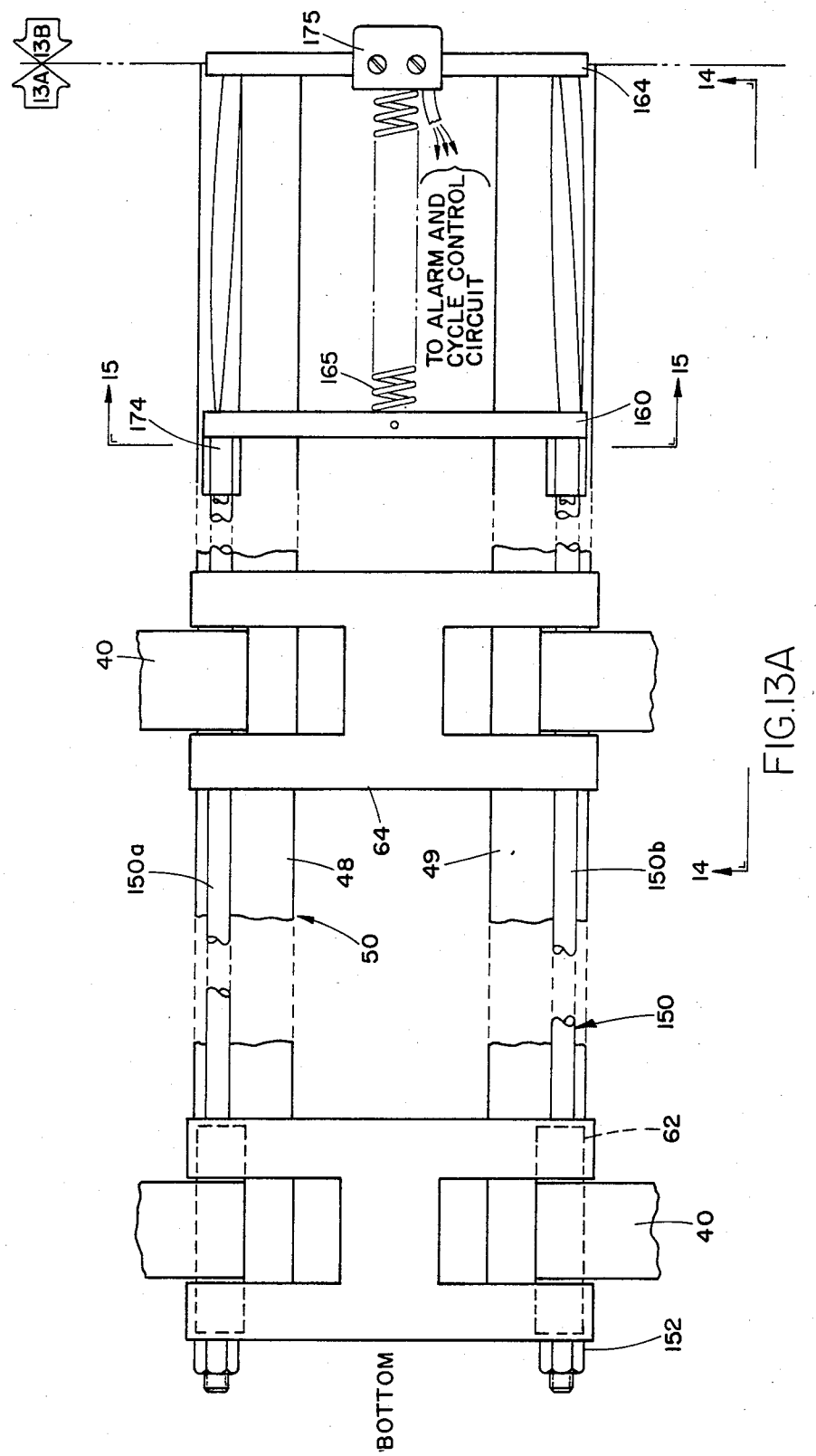

STERILIZER DOOR ASSEMBLY

This invention relates to the art of door closures for sterilizers and other applications where a container, cabinet, compartment or room is maintained under pressure for conducting sterilization or other process; and more particularly, the invention concerns a door assembly for such an application wherein the door assembly has improved locking and safety features.

It has been known heretofore to provide a door or closure for a sterilizer with a centrally located mechanism operating a plurality of radially arranged locking bars. The bars are extendable axially to engage in sockets in a door frame, and are axially retractable therefrom. For some installations a motor is provided to drive the mechanism. Such a conventional arrangement is further provided with a manual or motor operated lever assembly for locking the extended bars in place. If one of the arms on a conventional radial arm mechanism fails to engage its socket and the mechanism continues to be driven towards closing, there is sometimes damage to the arm support or the central operating mechanism. Where the door is square or rectangular difficulties are encountered because the radially arranged locking bars are of unequal length. The bars extending to the corners of the door frame are longer than other bars extending to the top, bottom, and sides of the door frame. When the door is under high pressure during operation of the sterilizer or other application, the longer bars hold the door closed less securely than the shorter bars because of greater leverage effect between the door frame and the centrally located operating mechanism.

Further difficulties are encountered where the doors are large, for example, 2 feet by 5 feet or more where two motions are required. One engages/disengages the arms and another locks/unlocks the door by compressing/releasing a sealing gasket. On some doors each of these motions has a separate actuator. On other doors, the two motions have been integrated into a single input motion by means of an integrating mechanism such as a cam and follower. Still another difficulty encountered in large doors is that the arms are of variable length and usually of varying end cutoff angles. The attachment to the central actuator must accommodate two angular motions and thus requires either a ball/socket joint or two pinned joints.

Pressure lock mechanisms to prevent unlocking of the door of a pressurized chamber have been routinely provided on many manually operated door locking mechanisms. They have been provided on some large powered door locking mechanisms and have experienced some operational difficulties. Among these are loss of function with loss of power, inability to function properly with manual operation following loss of power, or difficulty in engaging/disengaging during periods when forces are applied to open/close the door locking arms.

The present invention is directed at an improved door assembly for a compartment or room of a sterilizer or other application, which overcomes the above mentioned and other difficulties and disadvantages of prior sterilizer door closures. The new door assembly has the following improved features:

1. The locking bars of the door assembly are disposed in a parallel array rather than radially.

2. There is a multiplicity of horizontal pairs of massive locking bars with the bars in each pair axially aligned and extend perpendicular to a long rail assembly defining a spine extending vertically and centrally of the door for substantially its full length.

3. The pairs of bars are equally spaced apart for the full vertical length of the door.

4. The bars are extended and retracted in a novel way, by moving the rail assembly horizontally toward and away from the door to turn the bars angularly while they enter or slip out of the sockets in the door frame.

5. When the bars are in fully extended position, they are automatically leveraged and locked close.

6. The bars are spring loaded and can retract axially so that damage to the door assembly, door frame and the mechanism actuating and supporting the rail assembly will not occur in the event one or more bars does not engage the door frame properly because of incomplete closure of the door, some obstruction or other defect.

7. The locking bars carry cables which actuate a switch in an alarm circuit to indicate imperfect locking of the door assembly, so that a sterilization or other processing cycle will not be started until the sterilizer door is properly locked by the locking bars.

8. The rail assembly is motor driven and limit switches are provided to stop the motor automatically when the rail and assembly is fully extended and retracted.

The safety features incorporated in the invention insure safe operation of the door assembly at all times. The operation of the door assembly is automatic, but in an emergency the door mechanism can be operated manually to open or close the locking bars.

These and other objects and many of the attendant advantages of this invention will be readily appreciated as the same becomes better understood by reference to the following detailed description when considered in connection with the accompanying drawings in which:

FIG. 12 is a horizontal sectional view taken along line 12—12 of FIG. 11;

FIG. 14 is a fragmentary plan view taken along line 14—14 of FIG. 13; and

Figure 13B:
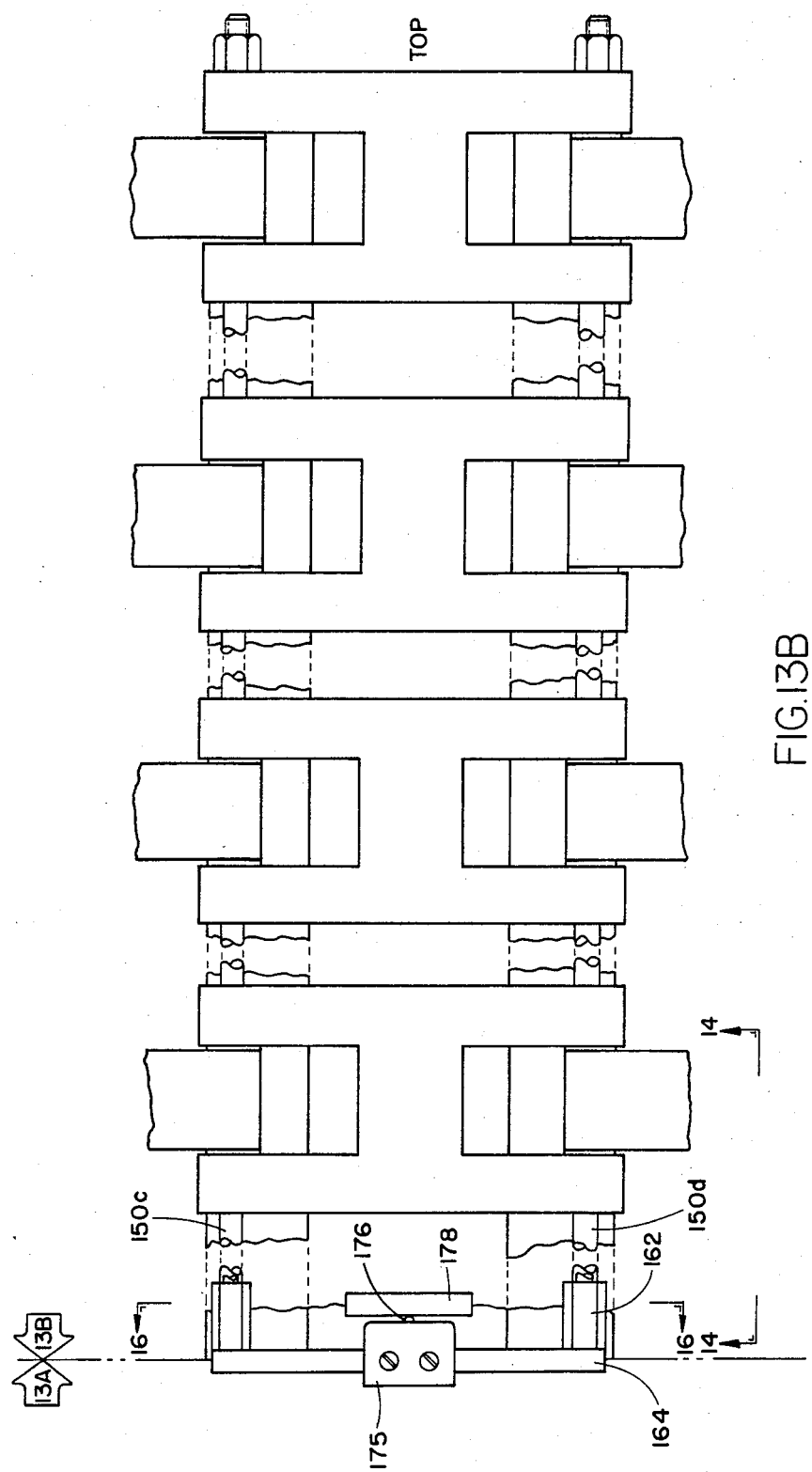
FIG. 13 (shown as FIG. 13A and FIG. 13B) is an elevational view of portions of the door assembly, showing parts of the rail assembly, locking bars, cables and associated parts.

FIGS. 15 and 16 are enlarged horizontal sectional views taken along line 15—15 and 16—16 respectively, of FIG. 13.

Figure 1:
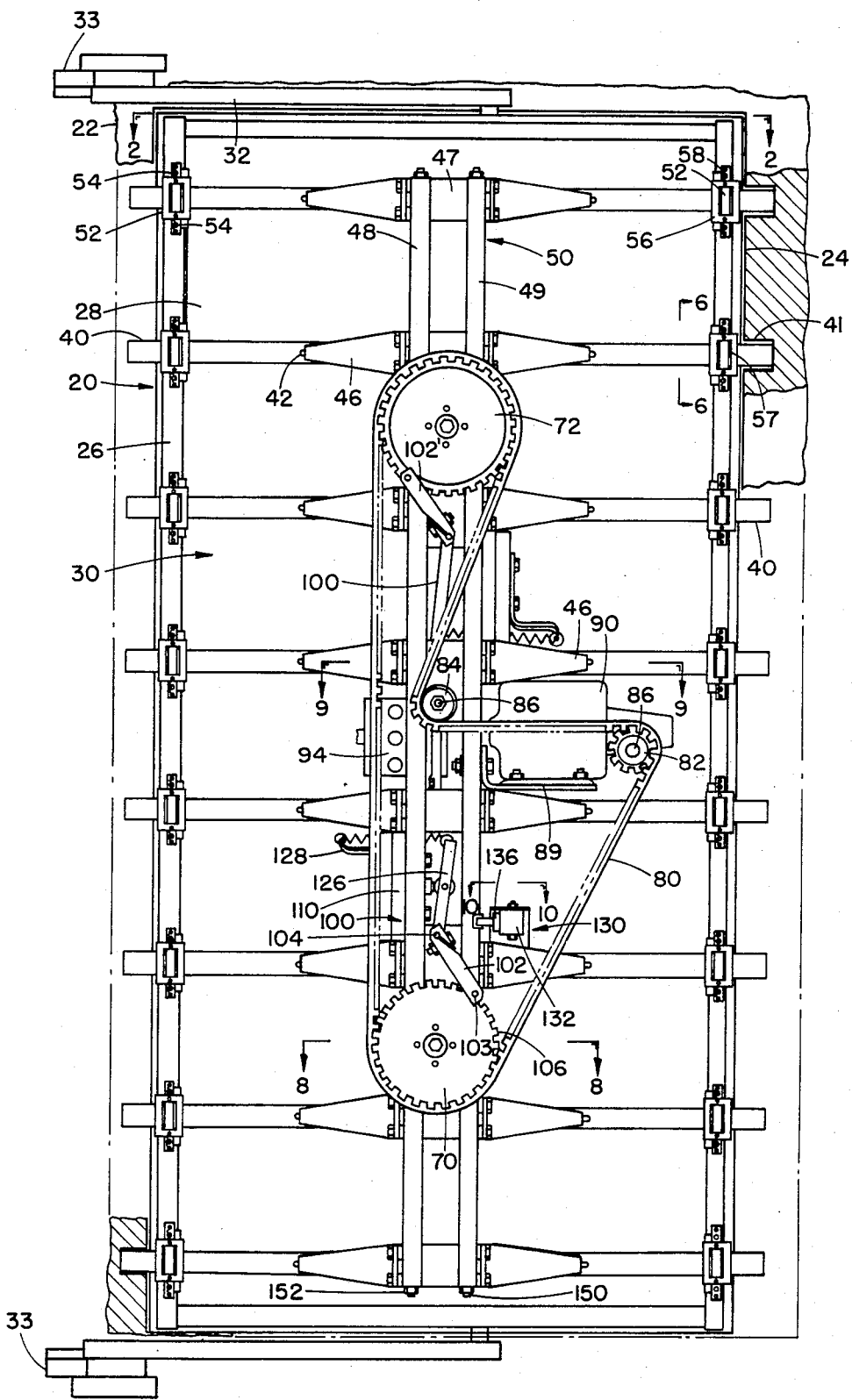
FIG. 1 is an outside elevational view of the door assembly embodying the invention, shown disposed in a doorway of a sterilizer.
Figure 1A:
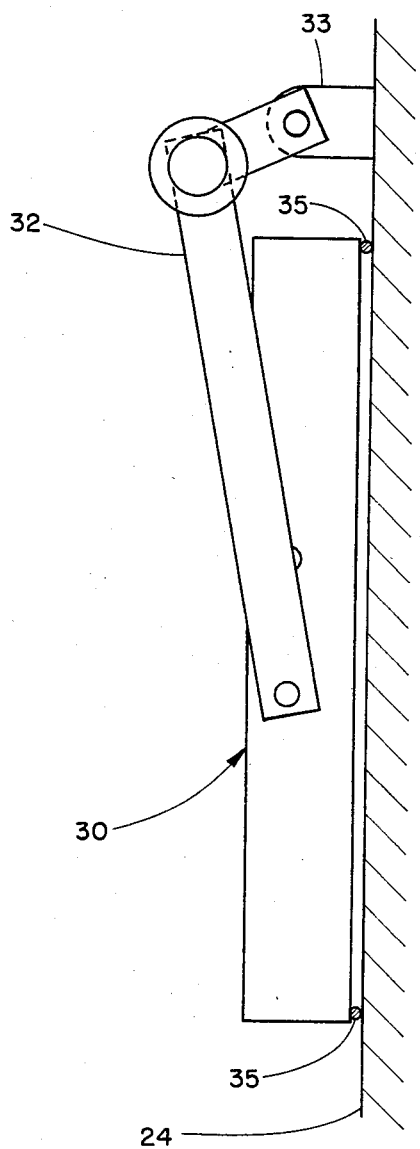
FIG. 1A is a top plan view showing the door and hinge.
Figure 2:
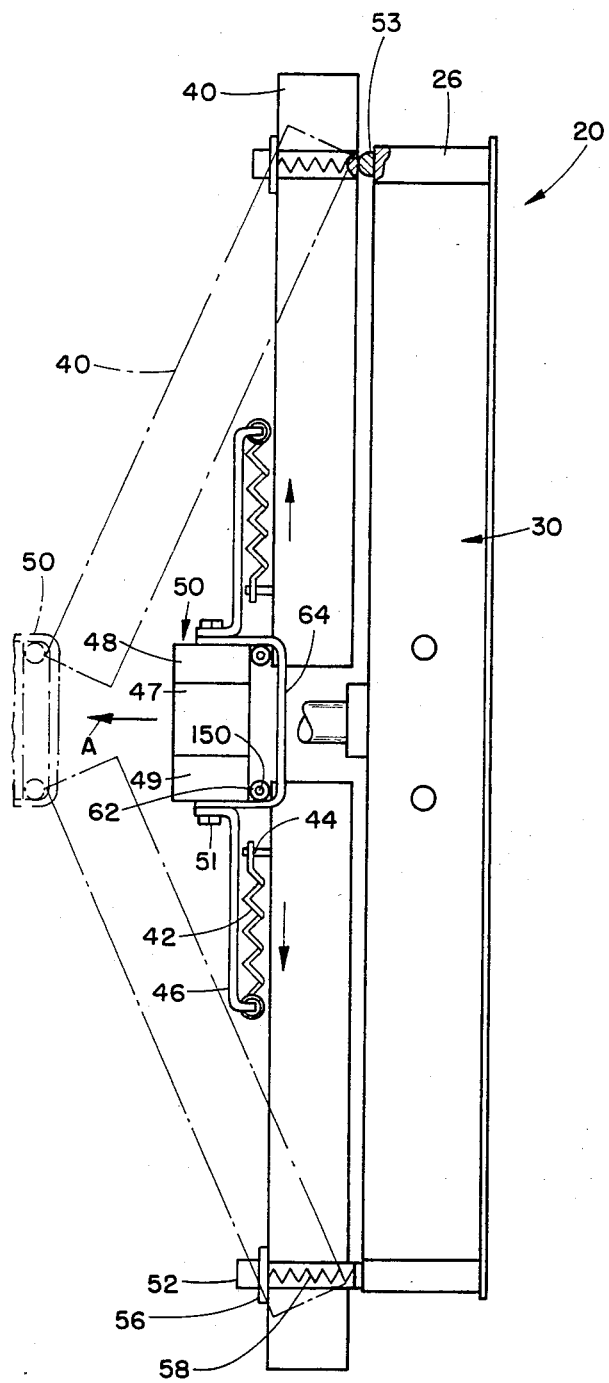
FIG. 2 is an enlarged top plan view taken along line 2—2 of FIG. 1, showing the door assembly per se.
Figure 3:
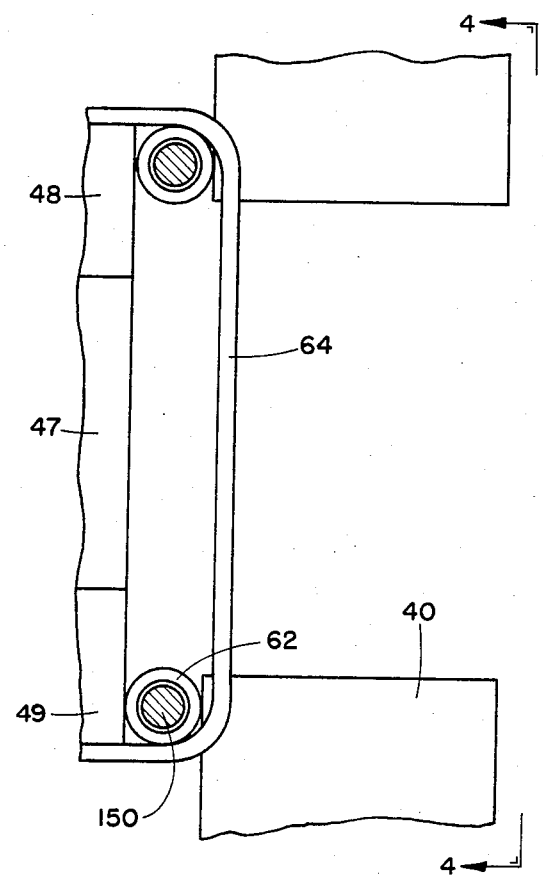
FIG. 3 is an enlargement of a portion of FIG. 2, showing details to better advantage.

Referring now the the drawings wherein like reference characters designate like or corresponding parts throughout, there is illustrated in FIGS. 1 and 2 a door assembly generally designated as reference numeral 20 for closing a sterilizer 22 having a rectangular doorway 24. The door assembly 20 has rigid rectangular frame 26 secured to panels 28 defining a door 30 which fits snugly in a doorway 24. The door 30 is pivotally supported by a hinge 32 at top and bottom. The hinge 32 is pivotally supported by supports 33 attached to doorway 24 at top and bottom. Disposed between the door 30 and the doorway 24 is a resilient sealing gasket 35, shown in FIG. 1A which is compressed to effect a seal between the door 30 and the doorway 24.

To the extent described, the assembly 20 is conventional. Now, according to the invention, the assembly 20 has a multiplicity of pairs of rigid, straight, rectangular locking bars 40, in this instance, eight pairs of bars 40, making a total of sixteen bars 40 for the entire assembly 20. The bars 40 in each of the bars 40 may engage in one of a multiplicity of openings 41 in doorway 24. Each of the bars 40 is movably supported by a coil spring 42 secured at one end to a pin 44 extending outwardly from the respective bar 40. The other end of each spring 42 is connected to one end of a tapered bracket 46. The other ends of the brackets 46 are secured to a rail 48 and a rail 49. The rails 48 and 49 are joined together by a spacer block 47 and a pair of bolts 51. The assembly of rails generally designated as reference numeral 50 carries all the locking bars 40.

Figure 6:
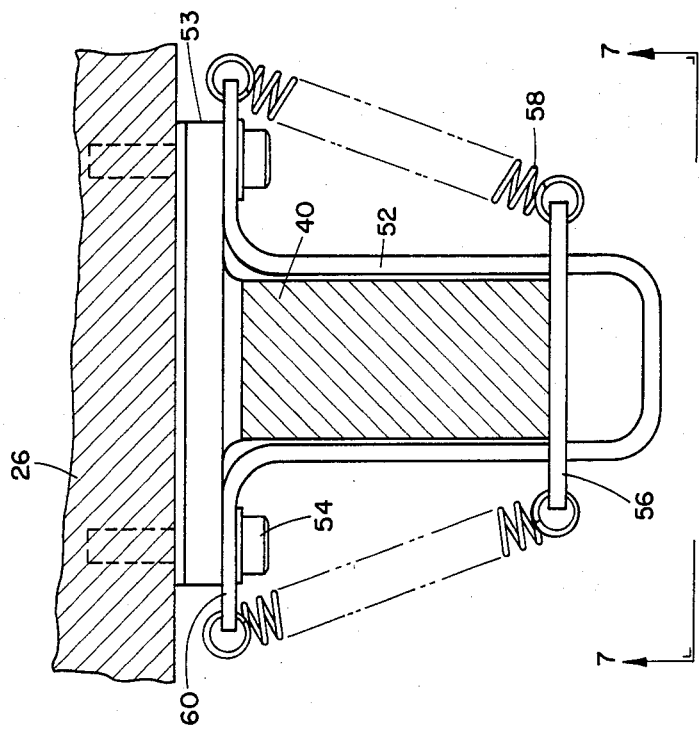
FIG. 6 is an enlarged fragmentary cross-sectional view taken along line 6—6 of FIG. 1.
Figure 5:
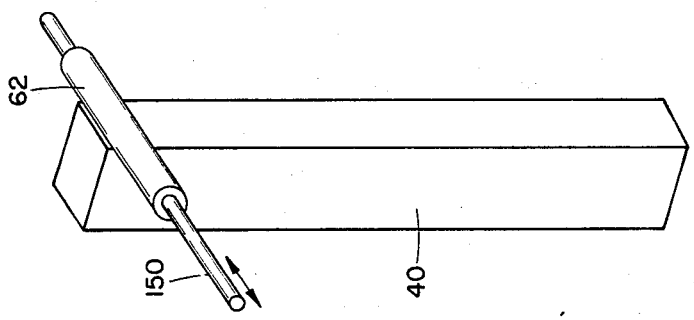
FIG. 5 is a perspective view of a locking bar and sleeve employed in the door assembly.
Figure 4:
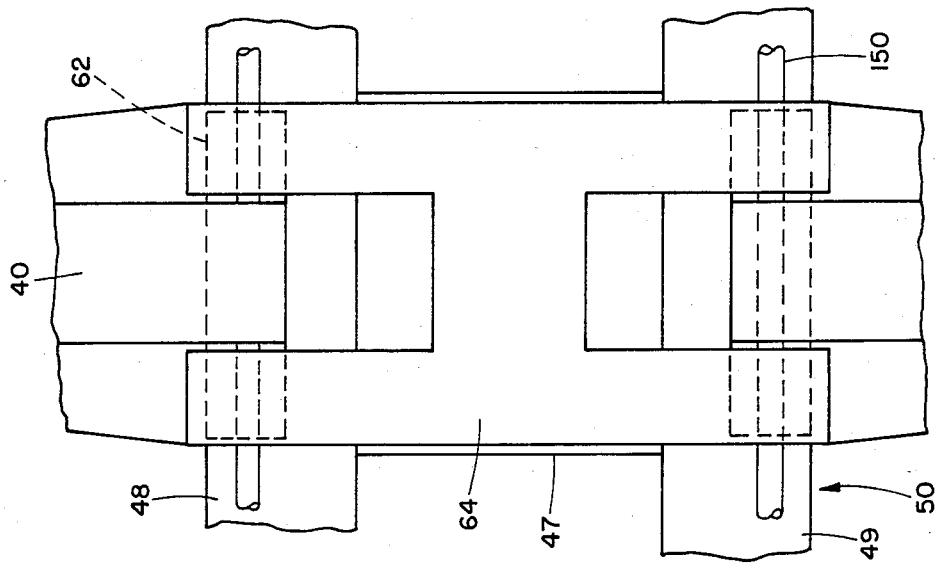
FIG. 4 is a side view taken along line 4—4 of FIG. 3.
Figure 7:
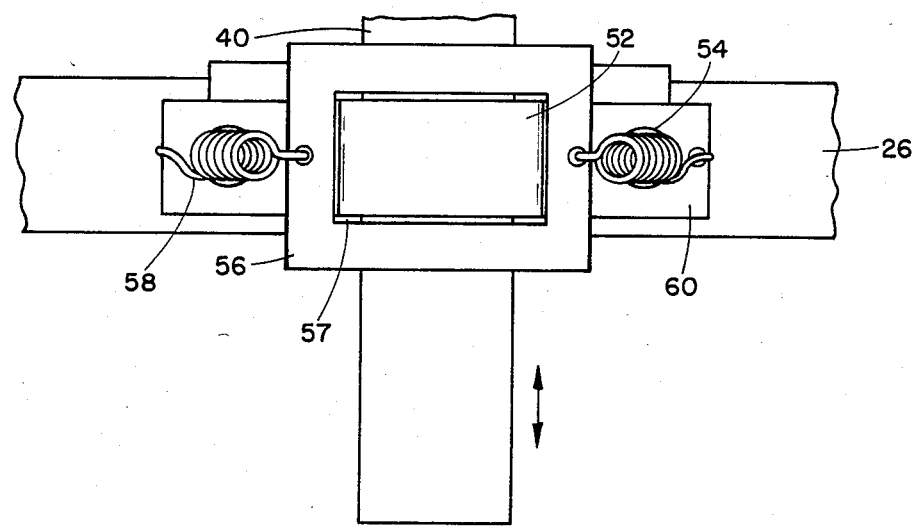
FIG. 7 is a fragmentary view taken along line 7—7 of FIG. 6.

The outboard end portions of the locking bars 40 are slidably engaged in U-shaped brackets 52 secured by bolts 54 to the door frame 26; see FIGS. 1, 6, and 7. A rectangular frame-like pressure plate 56 having a rectangular opening 57 is slidably disposed on each bracket 52 and abuts the outer side of the locking bar 40, as illustrated in FIGS. 6 and 7. A tensioned coil spring 58 is connected between each end of a flange 60 of each of the brackets 52 and each end of the pressure plate 56 thereby the pressure plate 56 yieldably engages the lower end of the locking bar 40, so that the bar 40 may be inclined outwardly and slide axially out of engagement with the respective oepning 41, while maintaining contact with fulcrum 53.

At the inboard end of each locking bar 40 is secured a vertical tubular sleeve 62; see FIGS. 2, 3, 4, and 5. The sleeves 62 are rotatably engaged by spaced arms of a generally H-shaped bracket 64 having outwardly turned ends secured to top and bottom sides of rails 48, 40 respectively. One pair of axially aligned locking bars 40 is thus slidably and turnably engaged by one of the brackets 64. The rail assembly 50 may be moved outwardly as indicated by arrow A to the dotted line position shown in FIG. 2. This will cause the inboard ends of the locking bars 40 to move outwardly to an angular inclination of about 25°, out of the respective socket 41 while being restrained by the pressure plates 56 in the bracket 52.

Figure 8:
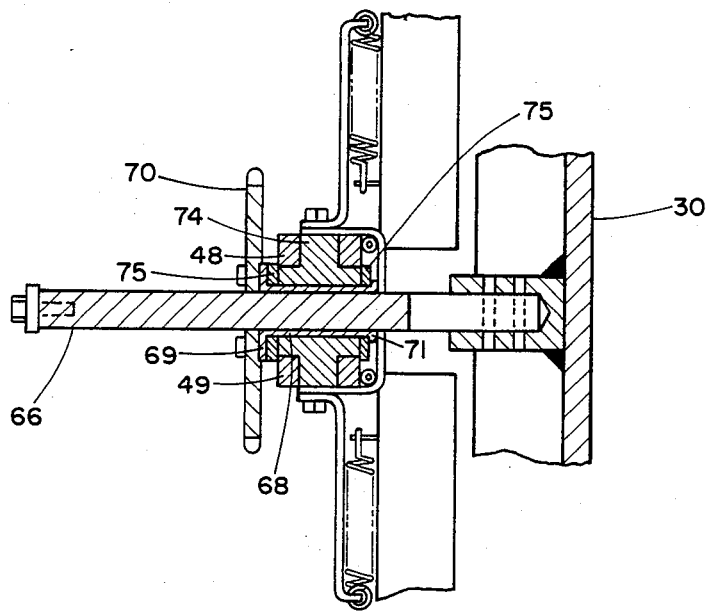
FIG. 8 is an enlarged fragmentary sectional view taken along line 8—8 of FIG. 1.

In order to support the rail assembly 50 vertically and to move it both outwardly from and toward the door 30, there is provided a pair of axially spaced posts 66 secured to the door 30 and extending outwardly therefrom; see FIG. 8. Each post 66 is threaded and engages into a threaded sleeve bearing 68 which has inner flange 71 and an external flange 69 which is secured to a rotatable sprocket 70, 72. Disposed between the external and inner flanges 69, 71 of the sleeve bearing 68 is a support block 74 to which the rails 48, 49 are pivotally secured. A roller bearing 75 is disposed between the block 74 and the external flange 69 of the sleeve bearing 68 and another roller bearing 75 is disposed between the inner flange 71 of the sleeve bearing 68 and the other end of the block 74. By this arrangement when the sprocket 70, 72 turns, the bearing 68 on the post 66 moves outwardly from door 30 or inwardly toward the door depending on the direction of rotation of the sprocket 70, 72. Outward movement of the bearing 68 carries the rail assembly 50 outwardly and turns the locking bars 40 angularly to withdraw their outer ends from the openings 41. Inward movement of the bearing 68 moves the rail assembly 50 inwardly toward the door 30 and turns the bars 40 in the opposite direction from the inclined to the in-line positions. It will be apparent that when the locking bars 40 assume the in-line positions, they are in effect, cammed or levered closed and cannot be dislodged unless the sprockets 70, 72 and the bearings 68 are turned to release the locking bars 40 from the openings 41.

Figure 9:
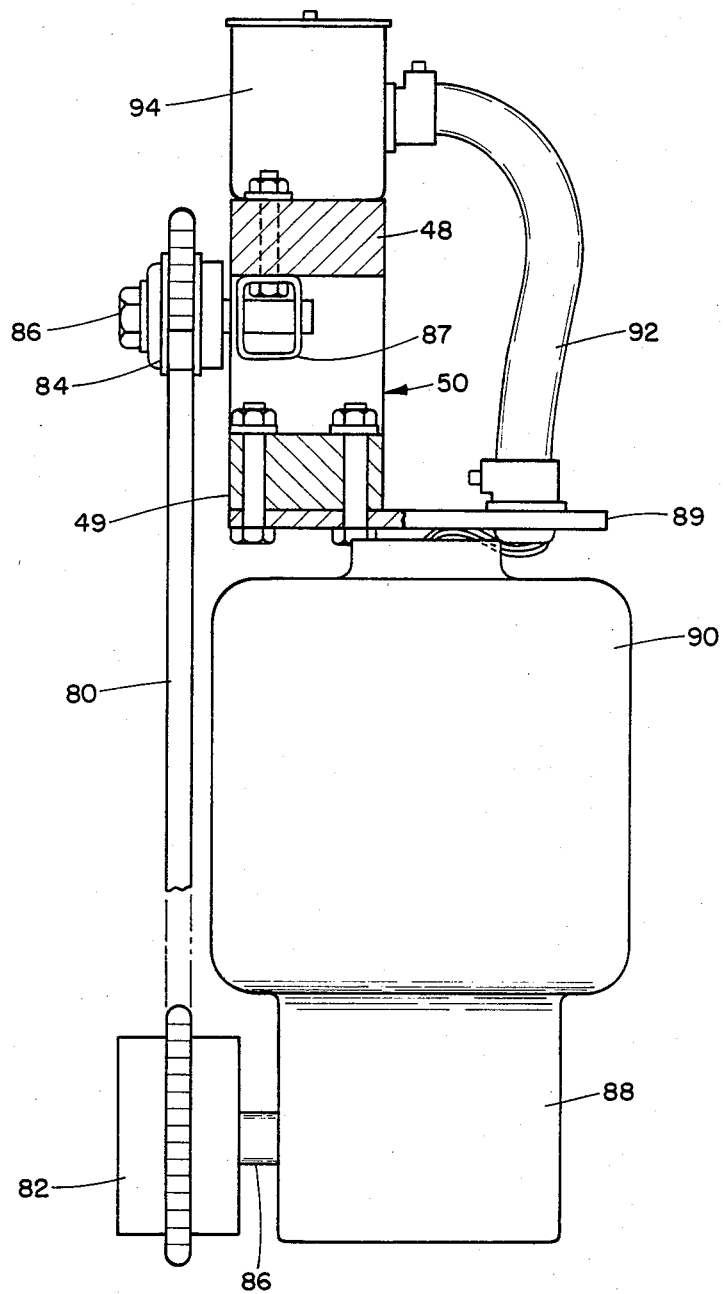
FIG. 9 is an enlarged fragmentary sectional view taken along line 9—9 of FIG. 1.

The sprockets 70, 72 are synchronized by an endless drive chain or timing belt 80 which extends around these sprockets and a drive sprocket 82 and an idler sprocket 84. The idler 84 is rotatably carried by a shaft 86 mounted by a bracket 87 on he rail 48. The sprocket 82 is carried by the drive shaft 86 of a speed reducing gear drive 88 driven by a reversible electric motor 90; see FIG. 9. The motor 90 is carried and secured by bracket 89 on the rail 50. Power is supplied to the motor 90 via a cable 92 connected to electrical terminal box 94 on the rail 48. The motor 90 rotates sprockets 70, 72 via the chain or belt 80 to close or open the locking bars 40.

Figure 11:
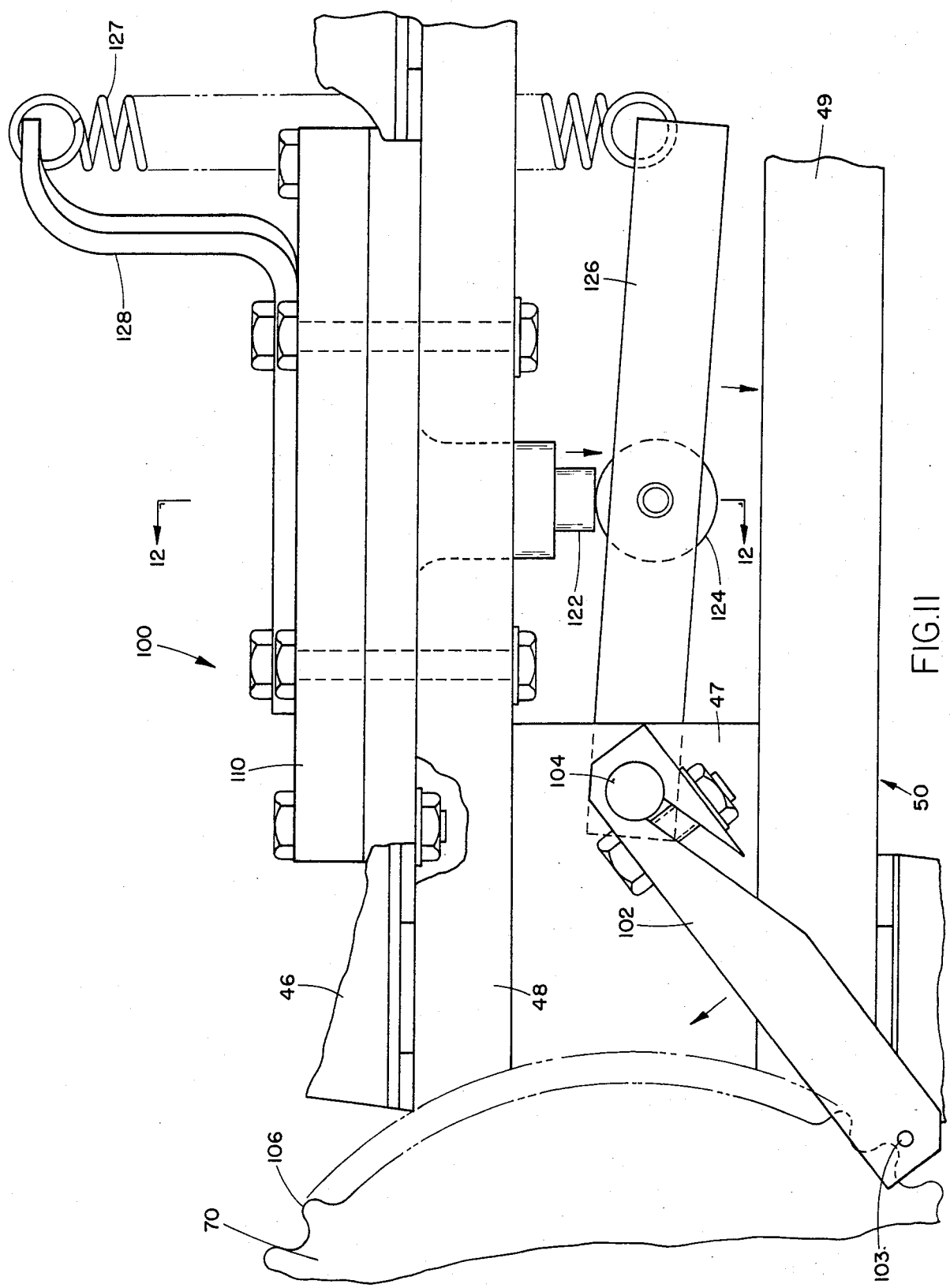
FIG. 11 is an enlarged elevational view of a portion of FIG. 1.

Pressure lock safety mechanisms 100 and 100' shown in FIGS. 1, 11, and 12, operate when there is a pressure in excess of two or three pounds per square inch in the sterilizer 22 to prevent opening rotation of the sprockets 70, 72. The safety mechanisms 100 and 100' are identical in structure, and include a lever 102 or 102' carried by a shaft 104 on the block 47. The outer end of the lever 102 carries a pin 103 which can engage between two adjacent teeth 106 of the sprocket 70 or 72 when the lever 102 or 102' is turned to a locking or safety position, clockwise as viewed in FIGS. 1 and 11. In order to actuate the mechanism 100, 100' automatically, there is provided a cylindrical casing 110 (best shown in FIGS. 11 and 12) which has an elastomeric diaphragm 112 disposed between two chamber 114, 116. The chamber 114 communicates with the interior of the sterilizer compartment via a passage 115, and a conduit 118 connected to an opening in the door 30. In the chamber 116 is a flat plate 120 disposed adjacent the diaphragm 112. Secured to the plate 120 is a shaft 122. The bottom end of a shaft 122 bears on a roller 124 carried by a link bar 126. One end of the link 126 is connected to the shaft 104. A coil spring 127 carried by a bracket 128 on the casing 110 is connected to the other end of the link 126. The shaft 104 is rotatably carried by the rail assembly 50.

When the door 30 is closed and locked, a sufficient rise in pressure of air, steam or sterilizing gas in the sterilizer 22 causes the diaphragm 112 to move the plate 120 outwardly. The shaft 122 moves the link 126 against tension of the spring 106 and turns the shaft 104 and the lever 102 causing the pin 103 to engage between the teeth 106 of the sprocket 70 or 72, to prevent opening rotation of the respective sprocket. When the pressure in the sterilizer 22 falls to a safe level, the lever 102 and the link 126 are turned in the opposite direction to disengage the pin 103 from the sprocket teeth 106. It will be noted that mechanisms 100 and 100' are similarly oriented. Thus, as viewed in FIG. 1, the lever 102 turns clockwise to engage the teeth of the sprocket 70 and lever 102' also turns clockwise to engage the teeth of the sprocket 72. The pressure lock safety mechanism 100 and 100' operate independently of each other. If the drive belt or chain 80 should break or come off the sprockets, the safety mechanisms 100, 100' will still operate because they are independent of the drive chain 80. This pressure lock mechanism thus prevents rotation of sprockets 70, 72 at any time that significant chamber pressure is present to protect nearby personnel from inadvertent exposure to sterilizing gas.

Figure 10:
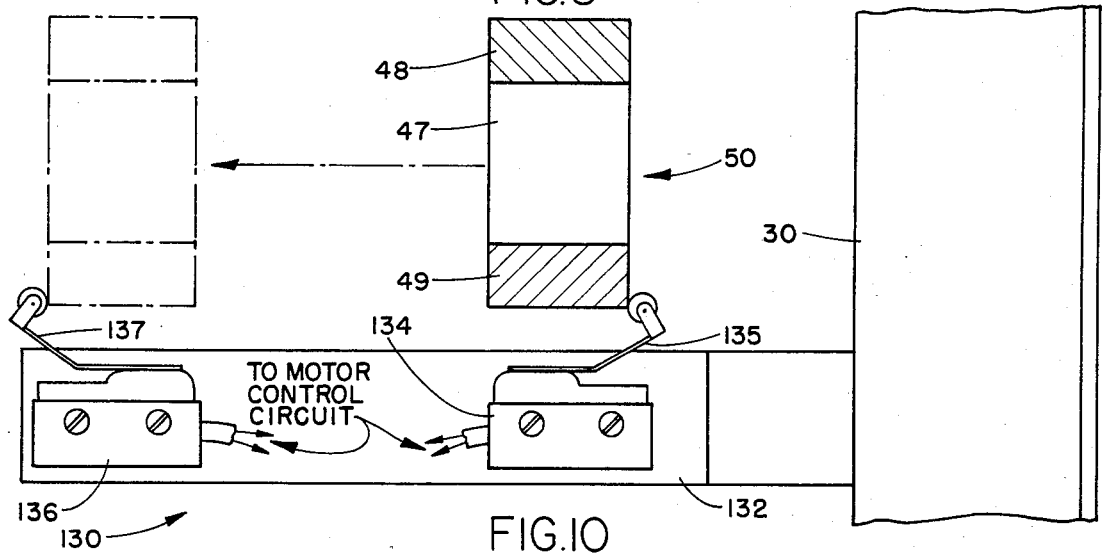
FIG. 10 is an enlarged fragmentary sectional view taken along line 10—10 of FIG. 1.

The door assembly 20 is provided with a limit switch arrangment 130 to stop the motor 90 automatically when the rail assembly 50 and locking bars 40 reach their extreme positions outwardly and inwardly with respect to the door 30. This arrangement is shown to best advantage in FIGS. 1 and 10. A stationary post 132 extends vertically out from the door 30, and carries two spaced limit switches 134, 136, having arms 135, 137 disposed in the line of travel of the rail assembly 50. As rail assembly 50 moves to its extreme inward position, shown in solid lines in FIG. 10, the arm 135 of the switch 134 is actuated by contact with the rail 49 to operate the motor drive control circuit to stop the motor and to provide for reversal of its direction of rotation. When the rail assembly 50 moves outwardly to the dotted line position in FIG. 10, the arm 137 is actuated to operate the motor drive control circuit to stop the motor and to provide for reversal of its direction of rotation. The motor control circuit is not shown here because it is beyond the scope of the present invention.

In the assembly thus far described, it will be noted that the locking bars 40 are loaded by the springs 42 which tend to urge the bars 40 axially to a horizontal, extended position. In the event that some obstruction is present at any one or more of sockets 41 so that a locking bar 40 cannot seat properly, the obstructed bar will remain in retracted position held by its associated stretched spring 42. This is a fail-safe arrangement and prevents damage to the door assembly and doorway frame in the event any one or more bars fails to seat properly.

The assembly is further provided with an alarm and an interlock means to indicate when any one or more of the locking bars 40 is not properly seated in its associated opening or openings 41, and prevents initiation of a high pressure sterilization or other processing cycle until the locking bars 40 are all seated properly in their respective opening 41. The alarm and interlock means includes a plurality of cables 150 movably extending through the sleeves 62 secured to the respective locking bars 40; see FIGS. 3, 4, 5, and 13-16. In the present assembly four cables 150 are provided. Each cable 150 passes through the sleeves 62 of four adjacent locking bars 40. One end of each cable 150 is secured by nut 152 at the outer end of the sleeves 62. Cable 150a, coming from the bottom four left locking bars 40, and cable 150b coming from the four bottom right locking bars 40 pass through respective openings 154 and 156 in a vertically movable plate 160 and terminate at fasteners 162 at the outer side of a vertically movable plate 164; see FIGS. 13-16. The plates 160 and 164 are spaced apart and are pushed apart by a compressed coil spring 165. Cable 150c coming from the four top left locking bars 40 and cable 150d coming from the four top right locking bars 40 pass through respective opening 170, 172 in the plate 164 which carries a microswitch 175 whose operating pin 176 is located adjacent to a plate 178 (FIG. 13) carried by the rod 166. One end of rod 166 is slidably engaged with plate 164. The other end of rod 166 is pinned to the plate 160. The plates 160 and 164 are mounted to move if any one or more cables 150 moves or is pulled due to tension placed upon it when any associated locking bar 40 fails to seat properly in its assigned socket 41. The microswitch 175 will be actuated by movement of the plates 160, 164, to operate an alarm and an interlock in the control circuit of the sterilizer 22 to prevent progress into a sterilization cycle with a partially secured door. This will alert the operator to take remedial measures to permit the displaced locking bar 40 to seat properly, whereupon the position in the associated cable 150 will be restored to normal, and the microswitch 175 will be deactivated. This will turn off the alarm so that the processing cycle can be started.

Although the system has been arranged to operate automatically, it is possible to operate it manually in the event of power failure. The sprockets 70 and 72 may be turned manually by means of a wrench after first releasing the friction drive clutch built into the drive sprocket 82. The male end of a ½ inch square drive wrench is inserted into a square hole in either the sprocket 70 or 72. All sprockets which are entrained by the drive chain 80 will rotate and the rail assembly 50 will move outwardly to withdraw the locking bars 40 from the sockets 41, or vice versa.

It should be understood that the foregoing relates to only a preferred embodiment of the invention which has been by way of example only and that it is intended to cover all changes and modifications of the examples of the invention herein chosen for the purposes of the disclosure, which do not constitute departures from the spirit and scope of the invention.

What is claimed is:
1. A door assembly for a pressure/vacuum vessel such as a sterilizer or the like, for securely closing an opening in a doorway defined by a rectangular frame having therein spaced sockets for receiving locking members, comprising:
 a door adapted to fit in said doorway;
 a plurality of pairs of straight locking bars disposed in parallel array across said door;
 a rail assembly extending across said door perpendicular to said bars and supporting said bars at adjacent ends thereof;
 spring means yieldably engaging opposite end portions of said bars adjacent to opposite edges thereof;
 means for moving said rail assembly laterally away from and toward said door while said bars turn angularly and move axially for selectively engaging in and withdrawing from said sockets, comprising:
 at least one threaded post secured to said door and extending outwardly therefrom;
 a threaded means engaged on said post and carried by said rail assembly, so that said rail assembly moves toward and away from said door depending on the direction of rotation of said threaded means; and motor means operatively connected to and driving said threaded means.

2. A door assembly as defined in claim 1, further comprising other spring means carried by said rail assembly, connected to and supporting said bars, so that any one of said bars obstructed from entering adjacent ones of said sockets can retract axially, while the other ones of said bars enter adjacent other ones of said sockets.

3. A door assembly as defined in claim 1, further comprising limit switch means carried by said door and connected in circuit with said motor means said switch means being disposed for actuation by said rail assembly at two extreme positions respectively adjacent to and spaced from said door for stopping and reversing rotation of said motor means.

4. A door assembly as defined in claim 1, wherein said motor means comprises:
- a motor carried by said rail assembly; and
- transmission means operatively connecting said motor and said threaded means for rotating the same.

5. A door assembly as defined in claim 4, wherein said transmission means comprises:
- a bearing connected to said threaded means and rotating therewith; and
- an endless drive member entrained on said sprocket and driven by said motor for turning said threaded means.

6. A door assembly as defined in claim 5, further comprising:
- a lever pivotally carried by said rail assembly and arranged to stop opening rotation of said threaded means; and
- means responsive to pressure within said sterilizer and arranged to pivot said lever to stop opening rotation of said threaded means when said pressure exceeds a predetermined magnitude, so that said rail assembly cannot then be moved with respect to said door for unlocking said bars in place in said sockets.

7. A door assembly as defined in claim 2, wherein said means for moving said rail assembly comprises:
- a plurality of threaded posts secured to said door in laterally spaced positions and extending outwardly therefrom;
- a plurality of bearings respectively engaged on said posts and carried by said rail assembly so that said rail assembly moves toward and away from said door depending on the direction of motion of said bearings;
- sprockets secured to said bearings respectively to move them;
- a motor carried by said rail assembly; and
- an endless drive member entrained on said sprockets and driven by said motor for moving said bearings.

8. A door assembly as defined in claim 7, further comprising:
- a plurality of levers pivotally carried by said rail assembly and arranged to stop opening rotation of said sprockets; and
- means responsive to pressure within said sterilizer and arranged to pivot said levers to stop opening rotation of said sprockets when said pressure exceeds a predetermined magnitude, so that said rail assembly cannot then be moved with respect to said door for unlocking said bars in place in said sockets.

9. A door assembly as defined in claim 8, further comprising:
- cable means movably engaged with said locking bars; and
- switch means engaged with and operable by said cable means for actuation of alarm and interlock means when any one of said locking bars fails to engage properly in an associated one of said sockets.

* * * * *